US009764523B2

(12) United States Patent
Belnap et al.

(10) Patent No.: US 9,764,523 B2
(45) Date of Patent: Sep. 19, 2017

(54) HIGH PRESSURE CARBIDE COMPONENT WITH SURFACES INCORPORATING GRADIENT STRUCTURES

(71) Applicant: SMITH INTERNATIONAL, INC., Houston, TX (US)

(72) Inventors: J. Daniel Belnap, Lindon, UT (US); Lan Carter, Payson, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 662 days.

(21) Appl. No.: 13/684,607

(22) Filed: Nov. 26, 2012

(65) Prior Publication Data

US 2013/0133531 A1 May 30, 2013

Related U.S. Application Data

(60) Provisional application No. 61/564,816, filed on Nov. 29, 2011.

(51) Int. Cl.

| | |
|---|---|
| ***B32B 15/00*** | (2006.01) |
| ***B30B 15/00*** | (2006.01) |
| ***B32B 15/01*** | (2006.01) |
| ***B22F 7/02*** | (2006.01) |
| ***B22F 3/24*** | (2006.01) |
| ***C22C 1/05*** | (2006.01) |
| ***C22C 1/10*** | (2006.01) |
| ***C22C 29/06*** | (2006.01) |

(Continued)

(52) U.S. Cl.

CPC ................ *B30B 15/00* (2013.01); *B22F 3/24* (2013.01); *B22F 7/02* (2013.01); *B30B 11/004* (2013.01); *B30B 15/022* (2013.01); *B32B 15/01* (2013.01); *C22C 1/051* (2013.01); *C22C 1/1094* (2013.01); *C22C 29/06* (2013.01); *C22C 29/08* (2013.01); *B22F 7/06* (2013.01); *B22F 2207/03* (2013.01); *B22F 2999/00* (2013.01); *Y10T 428/12021* (2015.01)

(58) Field of Classification Search

USPC .................... 75/236, 240; 428/469, 472, 698

See application file for complete search history.

(56) References Cited

U.S. PATENT DOCUMENTS

| | | |
|---|---|---|
| 3,136,615 A | 6/1964 | Bovenkerk |
| 4,350,528 A | 9/1982 | Engle |

(Continued)

FOREIGN PATENT DOCUMENTS

| | | |
|---|---|---|
| EP | 0194018 A1 | 9/1986 |
| WO | 92/18656 A1 | 10/1992 |

OTHER PUBLICATIONS

Liu et al "Preparation and Fatigue Properties of Functionally Graded Cemented Carbide" AIP Conference Proceedingd 973 (2008) p. 556-561.*

(Continued)

*Primary Examiner* — Archene Turner

(57) ABSTRACT

An anvil including a hard phase and a metal matrix in which the hard phase is dispersed, a concentration of the metal matrix phase varying according to a concentration gradient, is disclosed. The anvil may be used in a high pressure press. Methods of making an anvil including forming a hard phase dispersed in a metal matrix phase, a concentration of the metal matrix phase varying according to a concentration gradient, are also disclosed.

18 Claims, 10 Drawing Sheets

(51) Int. Cl.

| | |
|---|---|
| ***C22C 29/08*** | (2006.01) |
| ***B30B 11/00*** | (2006.01) |
| ***B30B 15/02*** | (2006.01) |
| *B22F 7/06* | (2006.01) |

(56) References Cited

U.S. PATENT DOCUMENTS

| | | | | |
|---|---|---|---|---|
| 4,820,482 | A * | 4/1989 | Fischer | C22C 29/08 75/242 |
| 5,279,901 | A | 1/1994 | Akerman et al. | |
| 5,453,241 | A | 9/1995 | Akerman et al. | |
| 5,603,075 | A * | 2/1997 | Stoll | C22C 29/005 75/240 |
| 5,619,000 | A * | 4/1997 | Ederyd | B01J 3/065 75/240 |
| 5,780,139 | A | 7/1998 | Carter et al. | |
| 5,789,686 | A | 8/1998 | Massa et al. | |
| 5,856,626 | A | 1/1999 | Fischer et al. | |
| 6,122,014 | A | 9/2000 | Panusopone et al. | |
| 6,299,992 | B1 * | 10/2001 | Lindskog | C22C 29/08 428/698 |
| 6,706,327 | B2 | 3/2004 | Blomstedt et al. | |
| 6,869,460 | B1 * | 3/2005 | Bennett | C22C 29/08 428/547 |
| 7,360,441 | B2 | 4/2008 | McAllister et al. | |
| 7,569,179 | B2 | 8/2009 | Fang | |
| 7,699,904 | B2 * | 4/2010 | Fang | B22F 7/02 75/240 |
| 8,277,959 | B2 * | 10/2012 | Arvanitidis | B22F 7/06 428/698 |
| 2005/0276717 | A1 * | 12/2005 | Fang | B22F 7/02 75/236 |
| 2007/0007376 | A1 | 1/2007 | Condon et al. | |

OTHER PUBLICATIONS

Put et al "Functionally graded WC-Co materials produced by electropheric depostion" Scripta Materialia 45 (2001) p. 1139-1145.*

Nomura et al "Material design method for the functionally graaded cemented carbide tool" Int. Jour. of Ref. Matal & Hard Materials 12 (1999) p. 397-404.*

Frost et al., A new large-volume multianvil system,: Physics of the Earth and Planetary Interiors, 2004, vols. 143-144: pp. 507-514.

Anonymous, Engineering Your Competitive Edge Brochure, Kennametal Special Products, 2004: pp. 1-4.

Anonymous, Sandvik H10F Brochure—Extra-fine grain Cemented Carbide Grade for Rotary Tools, Sandvik Hard Materials, 2001: p. 1.

Shatskiy et al., "High pressure generation using scaled-up Kawai-cell," Physics of the Earth and Planetary Interiors, 2011, vol. 189: pp. 92-108.

Walker, "Lubrication, gasketing, and precision in multianvil experiments," American Mineralogist, 1991, vol. 76: pp. 1092-1100.

Jie et al., "Research Progress of Fabrication Technology of Functionally Gradient Hard Metals and Cermets", Materials for Mechanical Engineering, vol. 33, No. 2, 2009, 4 pages.

First Office Action and Search Report issued in corresponding Chinese application 201280058718.5 on Apr. 24, 2015. 16 pages.

Second Office Action and Search Report issued in corresponding Chinese application 201280058718.5 on Jan. 25, 2016. 23 pages.

Third Office Action issued in corresponding Chinese application 201280058718.5 on Aug. 1, 2016. 13 pages.

Office Action issued in corresponding Japanese application 2014544811 on Sep. 5, 2016. 7 pages.

International Search Report and Written Opinion issued in corresponding International application PCT/US2012/066604 on Feb. 14, 2013. 10 pages.

International Preliminary Report on Patentability issued in corresponding International application PCT/US2012/066604 on Jun. 3, 2014. 9 pages.

Decision of Rejection issued in corresponding Chinese Application 201280058718.5 on Jan. 25, 2017. 13 pages.

First Office Action and Search Report issued in corresponding Chinese application 201280058718.5 dated Apr. 24, 2015. 16 pages.

Second Office Action and Search Report issued in corresponding Chinese application 201280058718.5 dated Jan. 25 2016. 23 pages.

Third Office Action issued in corresponding Chinese application 201280058718.5 dated Aug. 1, 2016. 13 pages.

Office Action issued in corresponding Japanese application 2014544811 dated Sep. 5,2016. 7 pages.

International Search Report and Written Opinion issued in corresponding International application PCT/US2012/066604 dated Feb. 14, 2013. 10 pages.

International Preliminary Report on Patentability issued in corresponding International application PCT/US2012/066604 dated Jun. 3, 2014. 9 pages.

Guo et al. Kinetics of the formation of metal binder gradient in WC-Co by carbon diffusion induced liquid migration, Acta Materialia, 2011 4, vol. 59. pp. 4719-4731.

* cited by examiner

HIGH PRESSURE CARBIDE COMPONENT WITH SURFACES INCORPORATING GRADIENT STRUCTURES

CROSS-REFERENCE TO RELATED APPLICATION

This application claims the benefit of U.S. Provisional Patent Application Ser. No. 61/564,816 filed Nov. 29, 2011, which is incorporated herein by reference in its entirety.

BACKGROUND

Anvils incorporated in ultra-high pressure presses, such as cubic presses or belt presses, which are used in producing diamonds, polycrystalline diamond composites and cubic boron nitride, generate pressures in excess of 50 kilobars and are adjacent to press capsules having interior temperatures in excess of 1400° C. A typical anvil used in a cubic press is approximately 18 cm long with a base diameter of approximately 18 cm, but such anvils may be smaller or they may be significantly larger.

In order to apply uniform pressure, the working surface of the anvil should have a high hardness. As the hardness of the working surface of the anvil increases, the uniformity of the pressure applied by the anvil also increases. Suitable materials for forming the anvil include, for example, cemented tungsten carbide, which generally includes tungsten carbide particles dispersed in a cobalt matrix.

SUMMARY

This summary is provided to introduce a selection of concepts that are further described below in the detailed description. This summary is not intended to identify key or essential features of the claimed subject matter, nor is it intended to be used as an aid limiting the scope of the claimed subject matter.

According to embodiments of the disclosed subject matter of the application, an anvil has a concentration gradient of a metal matrix phase in a hard phase. For example, the anvil may include a hard phase and a metal matrix phase in which the hard phase is dispersed, a concentration of the metal matrix phase varying according to a concentration gradient. In one embodiment, the hard phase includes a hard material selected from the group consisting of tungsten carbide, tantalum carbide, titanium carbide and combinations thereof. The metal matrix phase may include Co, Fe, Ni or combinations thereof.

The anvil may further include a working surface for applying high pressure, the concentration gradient extending from the working surface to a gradient depth within the anvil. In some embodiments, a concentration of the metal matrix phase at the working surface is lower than a concentration of the metal matrix phase at the gradient depth within the anvil by an amount in a range of about 1 to about 2%. In other embodiments, a concentration of the metal matrix phase at the working surface is lower than a concentration of the metal matrix phase at the gradient depth within the anvil by an amount in a range of about 2 to about 4%. In still other embodiments, a concentration of the metal matrix phase at the working surface is lower than a concentration of the metal matrix phase at the gradient depth within the anvil by an amount in a range of about 4 to about 6%. In some embodiments, the concentration of the metal matrix phase at the working surface is in a range of about 5 weight percent to about 9 weight percent based on the total weight of the hard material and the metal matrix phase. The concentration of the metal matrix phase at the gradient depth within the anvil may be in a range of about 9 weight percent to about 14 weight percent based on the total weight of the hard material and the metal matrix phase.

In some embodiments, a concentration of the metal matrix phase along the concentration gradient as it extends from the working surface to the gradient depth within the anvil. For example, the concentration of the metal matrix phase may increase continuously along the concentration gradient as it extends from the working surface to the gradient depth within the anvil. In one embodiment, the gradient depth within the anvil is in a range of about 0.1 mm to about 2 mm from the working surface. For example, the gradient depth within the anvil may in a range from about 0.1 mm to about 1 mm from the working surface.

According to some embodiments, an anvil may have multiple concentration gradients (e.g., more than one concentration gradient). For example, an anvil may include a first gradient layer including a first hard phase and first metal matrix phase in which the first hard phase is dispersed, a concentration of the first metal matrix phase varying according to a first concentration gradient. The anvil may further include a second gradient layer including a second hard phase and a second metal matrix phase in which the second hard phase is dispersed, a concentration of the second metal matrix phase varying according to a second concentration gradient.

According to some embodiments, a method of making an anvil includes forming a hard phase dispersed in a metal matrix phase, a concentration of the metal matrix phase varying according to a concentration gradient. In some embodiments, forming the hard phase dispersed in the metal matrix phase includes obtaining a sample of a composite material including the hard phase and the metal matrix phase, the sample having a first layer and a second layer, the first and second layer each containing a quantity of the metal matrix phase, one of the layers being deficient in an element of the hard phase and one of the layers being enriched with the element of the hard phase. The method may further include sintering the sample under conditions which cause atoms of the element to diffuse in a direction from the enriched layer to the deficient layer and cause atoms of the metal matrix phase to flow in the same direction as the diffusion, thereby creating the concentration gradient of the metal matrix in the sample. In some embodiments, the hard phase includes tungsten carbide and the metal matrix phase includes cobalt. Forming the hard phase dispersed in the metal matrix phase may also include sintering the metal matrix phase in which the hard phase is dispersed to form a sintered body, and subjecting the sintered body to a carburizing or recarburizing heat treatment.

BRIEF DESCRIPTION OF THE DRAWINGS

The accompanying drawings, together with the specification, illustrate embodiments of the present invention, and, together with the description, serve to explain the principles of the invention.

DETAILED DESCRIPTION

Figure 1:
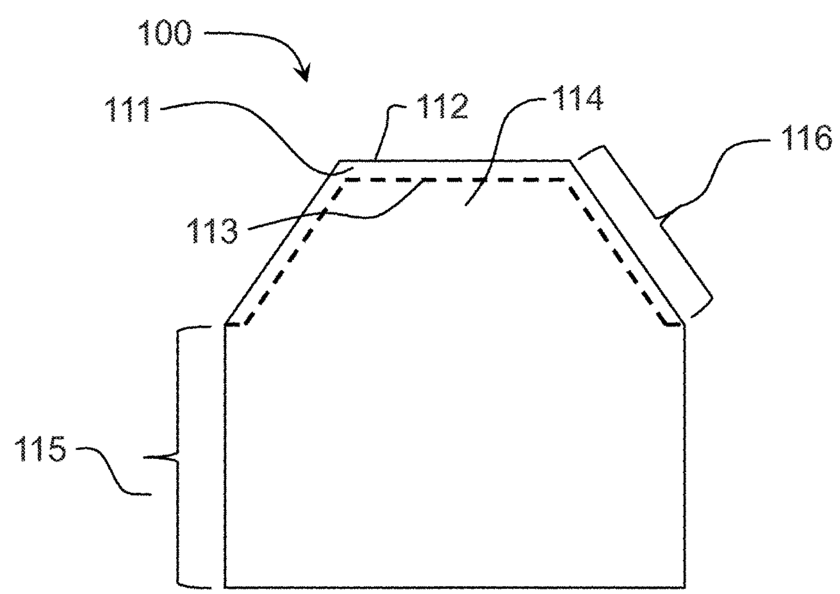
FIG. 1 is a longitudinal cross section through an anvil for a cubic press.

In the following detailed description, only certain embodiments of the present invention are shown and described, by way of illustration. As those skilled in the art would recognize, the invention may be embodied in many different forms and should not be construed as being limited to the embodiments set forth herein.

Embodiments of the disclosed subject matter of the present application are generally directed to an anvil including a concentration gradient (i.e., a gradient structure). For example, the anvil may include a hard phase and a metal matrix phase in which the hard phase is dispersed, wherein a concentration of the metal matrix phase varies according to a concentration gradient. In certain embodiments, the anvil includes a metal matrix phase concentration gradient such that the anvil has a relatively lower concentration of the metal matrix phase at a working surface (i.e., the surface adjacent to the highest pressure of the press) of the anvil and a relatively higher concentration of the metal matrix phase at a gradient depth within the anvil. That is, the metal matrix phase concentration in the anvil may be the lowest at the working surface of the anvil, and the metal matrix phase concentration may increase to its highest concentration according to a concentration gradient (e.g., a metal matrix phase concentration gradient) that extends from the working surface of the anvil to the gradient depth within the anvil.

The gradient anvil structure is particularly useful as cell pressures are increased above 60 kBar. To increase internal cell pressures, higher applied loads are generally applied to the anvils. This increases the amount of plastic deformation that occurs at the contact locations. This plastic deformation produces localized permanent strains in the metal phases which weaken the material and reduce the service life of the anvils. The plastic deformation also makes the anvils less efficient in producing internal cell pressure, which in turn leads to additional load being applied to compensate for the loss of efficiency, thereby further reducing the anvil service life. A localized gradient structure with reduced cobalt in the contact areas is able to reduce the amount of plastic deformation, and therefore the permanent strain in the metallic phase is reduced and the anvils can better maintain their shape during service.

Anvils incorporated in ultra-high pressure presses are described in more detail in U.S. Pat. No. 5,780,139, the entire content of which is expressly incorporated by reference herein. High hardness cemented tungsten carbide has a hardness suitable for the working surface of the anvil, but has a low fracture toughness and may crack under the peak stresses being subjected upon the anvil during operations. Consequently, monolithic anvils represent a compromise between desired resistance to plastic deformation at the anvil surfaces and having sufficient toughness to resist catastrophic crack growth and current anvils are limited in hardness to about 90-92 Rc (Rockwell Scale).

To overcome the above-described problem, anvils have been made from multiple layers of differing cemented tungsten carbide grades, in which the working layer adjacent to the highest pressure of a press has a higher hardness than a supporting layer behind it, and the supporting layer has a higher toughness than the working layer. Each layer of such anvils, however, includes a uniform composition of cemented tungsten carbide having little variation in the concentration of tungsten carbide or cobalt throughout the layer. Similarly, anvils including only a single layer of cemented tungsten carbide have little variation in the concentration of tungsten carbide and cobalt throughout the material. Because the hardness of cemented tungsten carbide depends upon the concentration of tungsten carbide and the toughness depends upon the concentration of cobalt, such layers have roughly constant hardness and toughness throughout the entire layer. Additionally, the layered structure is difficult to manufacture because powders are either carefully layered by lamination techniques or by machining in the green state. During sintering, the individual layers consolidate at different rates, which can lead to sintering related stresses which in turn can cause cracking. In operation, anvils with distinct layers can have distinct disadvantages due to residual stresses which arise in interfacial regions between the layers which can cause premature cracking and delamination. Accordingly, there is a need for an anvil that can take advantage of both the high hardness and toughness capabilities of cemented tungsten carbide while avoiding the stress concentrations which form at interfaces in distinct layers, to provide an ultra-high pressure press anvil capable of providing ultra-high pressures in the press, while retaining crack resistance characteristics and consistent life.

An anvil for use with a cubic press is used to describe embodiments by way of example. In FIG. 1, a cubic press anvil 100 including a concentration gradient 111 that extends from a working surface 112 to a gradient depth 113 within the anvil is depicted. For example, the concentration gradient 111 may be a gradient layer. The anvil also includes a portion of the anvil 114 that is adjacent to the concentration gradient 111, a base section 115 and a tip section 116. In certain embodiments, the concentration gradient 111 may extend from the entire working surface 112 (i.e., the entire outer surface of the tip section 116) to the gradient depth 113 within the anvil. In other embodiments, the concentration gradient 111 may extend from only a portion of the working surface 112 to only a portion of the gradient depth 113 within the anvil. Embodiments of the anvil can be used in any ultra-high pressure press operating in the pressure ranges where diamond and cubic boron nitride are stable.

For example, embodiments of the anvils can be used with multianvil cubic cells, such as those described in Walker, David, *Lubrication, gasketing, and precision in multianvil experiments*, American Mineralogist, Vol. 76, 1092-1100 (1991); Shatskiy, T., et al., *High pressure generation using scaled-up Kawai-cell*, Physics of the Earth and Planetary Interiors, (Aug. 11, 2011); Frost, *A new large-volume multianvil system*, Physics of the Earth and Planetary Interiors, Vol. 143, Issue 1-2, 507-514 (2004); and Appendix 1 of U.S. Provisional Application No. 61/564,816, the entire contents of each of which are herein incorporated by reference. In particular, embodiments of the anvils can be used in a uniaxial multianvil press in which load is transmitted to 6 wedges, which in turn load up 8 anvils surrounding a press cube. Alternatively, embodiments of the anvils can be used in a 6 anvil cubic press which is used to load an 8 anvil system as shown in Appendix 1 of U.S. Provisional Application No. 61/564,816.

Figure 2:
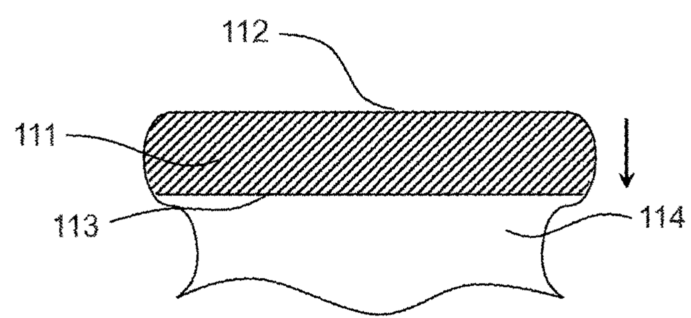
FIG. 2 is an enlarged view of a longitudinal cross section through an anvil for a cubic press.

FIG. 2 is an expanded view of the concentration gradient 111 and the portion of the anvil body 114 that is adjacent to the concentration gradient 111. As indicated by the arrow depicted in FIG. 2, the concentration of the metal matrix phase may increase along the concentration gradient 111 as it extends from the working surface 112 to the gradient depth 113 within the anvil. In some embodiments, the concentration of the metal matrix phase may increase continuously along the concentration gradient 111 as it extends from the working surface 112 to the gradient depth 113 within the anvil. For example, the concentration of the metal matrix phase may vary linearly along the concentration gradient 111 as it extends from the working surface 112 to the gradient depth 113 within the anvil. The present application, however, is not limited to continuous or linear concentration gradients, and instead, the concentration of the metal matrix phase may vary non-linearly, or even discontinuously, along the concentration gradient.

By including the metal matrix phase concentration gradient, the hardness and toughness of the anvil may be varied at different locations within the anvil to provide hardness and toughness suitable for each particular location within the anvil. For example, the hardness (i.e., compressive strength) of the working surface of the anvil may be increased, relative to the other portions of the anvil and relative to conventional anvil materials, by having a concentration of the metal matrix phase at the working surface that is lower than the typical concentration of the metal matrix phase in conventional anvil materials and lower than a concentration of the metal matrix phase at the gradient depth within the anvil. In some embodiments, the concentration of the metal matrix phase at the working surface is in a range of about 5 weight percent to about 9 weight percent based on the total weight of the hard material and the metal matrix phase. Additionally, the toughness at the gradient depth within the anvil may be increased (relative to the working surface) by having a concentration of the metal matrix phase at the gradient depth within the anvil that is higher than the concentration of the metal matrix phase at the working surface. In certain embodiments, the concentration of the metal matrix phase at the gradient depth within the anvil is in a range of about 9 weight percent to about 14 weight percent based on the total weight of the hard material and the metal matrix phase. In embodiments, the difference between the concentration of the metal matrix phase (e.g., a metallic phase) at the working surface and the concentration of the metal matrix phase at the interior bulk (e.g., at the gradient depth) is in the range of about 1 to about 2%. For example, the concentration of the metal matrix phase at the working surface can be lower than the concentration of the metal matrix phase at the gradient depth by an amount in a range of about 1 to about 2%. In other embodiments, the difference between the concentration of the metal matrix phase (e.g., a metallic phase) at the working surface and the concentration of the metal matrix phase at the interior bulk (e.g., at the gradient depth) is in the range of about 2 to about 4%. For example, the concentration of the metal matrix phase at the working surface can be lower than the concentration of the metal matrix phase at the gradient depth by an amount in a range of about 2 to about 4%. In still other embodiments, the difference between the concentration of the metal matrix phase (e.g., a metallic phase) at the working surface and the concentration of the metal matrix phase at the interior bulk (e.g., at the gradient depth) is in the range of about 4 to about 6%. For example, the concentration of the metal matrix phase at the working surface can be lower than the concentration of the metal matrix phase at the gradient depth by an amount in a range of about 4 to about 6%.

The hard phase may include any suitable hard material, such as tungsten carbide, tantalum carbide, titanium carbide or combinations thereof. In addition, the metal matrix phase may include any suitable binder material, such as Co, Fe, Ni or combinations thereof. In certain embodiments, the anvil includes cemented tungsten carbide. That is, the hard phase may include tungsten carbide and the metal matrix phase may include, for example, cobalt. By including a concentration gradient, the anvil may have a cobalt concentration at the working surface that is lower than a cobalt concentration at the gradient depth within the anvil and lower than the cobalt concentration in typical cemented tungsten carbide anvil materials. As a result of the lower cobalt concentration, the working surface of the anvil may have an increased hardness (relative to the gradient depth within the anvil and relative to typical cemented tungsten carbide anvil materials) and, therefore, the working surface may be able to apply higher and more uniform pressures. Such an anvil may also have a decreased toughness (relative to the gradient depth within the anvil and relative to typical cemented tungsten carbide anvil materials) at the working surface, resulting in a working surface that is brittle and more susceptible to cracking than the other portions of the anvil.

At the same time, the concentration gradient may result in a cobalt concentration at the gradient depth within the anvil that is higher than the cobalt concentration at the working surface and higher than (e.g., slightly higher than) or equal to the cobalt concentration in typical cemented tungsten carbide anvil materials. As a result, the toughness at the gradient depth within the anvil may be greater than the toughness at the working surface, and it may be greater than or equal to the toughness of typical cemented tungsten carbide anvil materials. Such an anvil may also have a decreased hardness (relative to the working surface) at the gradient depth within the anvil.

In some embodiments, the gradient depth within the anvil is in a range of about 0.1 mm to about 3 mm from the working surface. For example, the gradient depth within the anvil may be in a range of about 0.1 mm to about 1 mm, or about 0.1 mm to about 0.5 mm. By having the concentration gradient only extend to a shallow depth within the anvil (e.g., about 2 mm or less), it may be ensured that the low cobalt content (i.e., high hardness, but low toughness) portion of the anvil will not be exposed to the highest shear stresses of the press (i.e., the maximum shear stresses that can cause the anvil to crack). That is, to prevent cracking of the brittle high hardness working layer, the working layer is not exposed to the anvil maximum stresses. Typically, peak shear stresses occur at a small distance below the pressure applying surface of the working layer. The gradient depth is selected to be smaller than this distance to ensure that the peak shear stresses occur on a portion of the anvil having a cobalt concentration higher than that of the working surface. Use of a cobalt (or other binder metal) concentration gradient allows one to incorporate a higher toughness portion of the anvil adjacent to the high hardness working surface of the anvil. In other words, tailoring the anvil using the binder metal concentration gradient allows for fabrication of a better performing anvil that should be capable of withstanding its operating environment for consistently longer periods of time than anvils that do not include a gradient structure.

Figure 3:
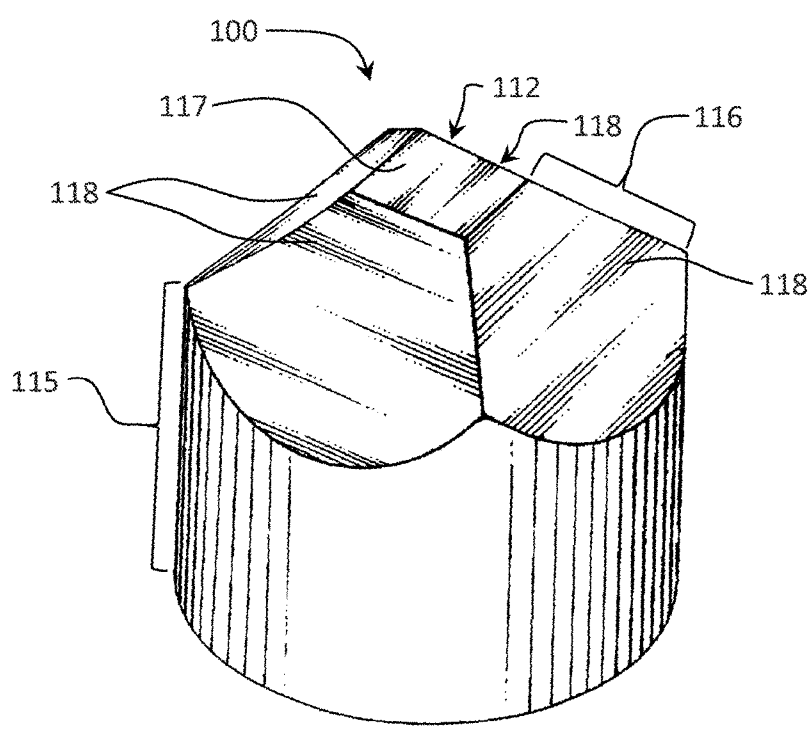
FIG. 3 is an isometric view of an anvil for a cubic press.

An ultra-high pressure press may include an anvil according to embodiments of the present invention. A more detailed view of a cubic press anvil 100 that can be used in a cubic press is shown in FIG. 3. A cubic press is one form of high pressure-high temperature press used for making diamond or cubic boron nitride or processing such materials into polycrystalline composites. Such presses are well described in patents and literature and are in use by several makers of diamonds and related materials. In such a press, six orthogonally arranged anvils are synchronously moved toward each other by hydraulic actuators. The converging anvils apply increasing pressure on materials within the cubic volume defined by the anvil faces. The gaps between the edges of anvils are sealed by high pressure gasket material such as pyrophyllite. Pressure is applied to the square end face of the anvil and to the diverging side faces by the gasket material.

As shown in FIG. 3, an illustrative embodiment of an anvil of the present invention, the cubic press anvil 100 includes a base section 115 and a tip section 116. The base section 115 has an approximately cylindrical shape, and the tip section 116 has a truncated square pyramidal shape. The working surface 112 has the highest hardness and the lowest toughness relative to the other portions of the anvil. The working surface 112 has a square end or working face 117 which faces into the high pressure cavity of the press. Four lateral faces 118 slope away from the edges of the end face at about a 45° angle. The gasket material squeezes out into the gaps between the lateral faces as pressure is applied by the anvils. The working surface is the surface that applies the pressure to the material being pressed by the press. High hardness of the working surface is beneficial as it ensures that a uniform ultra-high pressure can be applied to the material being pressed. Also, the higher hardness helps resist plastic deformation during service. As discussed earlier, the anvil described herein, is by way of example. The present invention is not limited only to this type of anvil. The anvil can be tailored to any suitable application to ensure uniform application of high pressure.

In another embodiment, the anvil includes multiple layers, such as the multiple layers described in U.S. Pat. No. 5,780,139, the entire content of which is expressly incorporated by reference herein. For example, in FIG. 4 a cubic press anvil 200 including seven layers (e.g., a first or working layer 219, a second layer 220, a third layer 221, a fourth layer 222, a fifth layer 223, a sixth layer 224 and a seventh layer 225 differing in hardness and toughness is depicted. Each anvil including multiple layers can be fabricated from multiple cemented tungsten carbide layers diffusion bonded together in accordance with U.S. Pat. No. 4,350,528, the entire content of which is expressly incorporated by reference herein.

Similarly to the anvils discussed above, the anvil including multiple layers includes a working surface 212, a base section 215 and a tip section 216. The base section includes roughly cylindrical layers and the tip section includes truncated pyramidal layers. One or more intermediate layers may be partially pyramidal and partially cylindrical.

Figure 5:
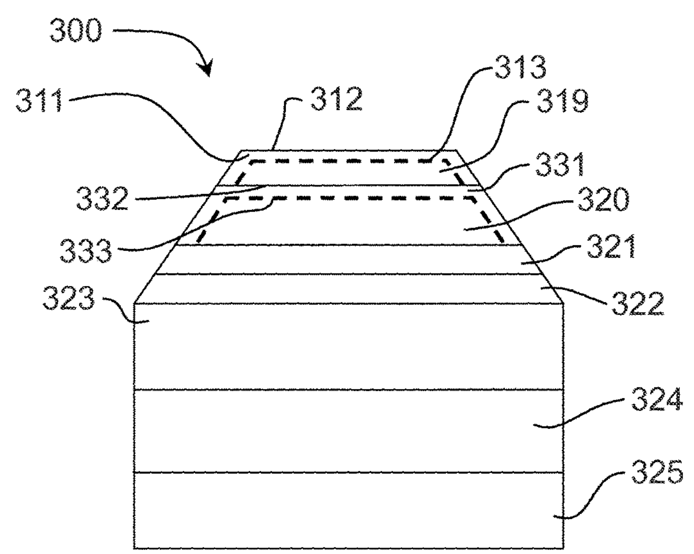
FIG. 5 a longitudinal cross section through a multi-layered anvil for a cubic press.

The first or working layer 219 is in the form of a truncated pyramid and includes a concentration gradient (i.e., a gradient structure), as discussed above. For example, the working layer may include a first hard phase and a first metal matrix phase in which the hard phase is dispersed, wherein a concentration of the first metal matrix phase varies according to a concentration gradient. In certain embodiments, the working layer includes a first metal matrix phase concentration gradient such that the working layer has a relatively lower concentration of the metal matrix phase at a working surface of the working layer and a relatively higher concentration of the first metal matrix phase at a first gradient depth within the working layer (e.g., a first gradient depth 313 as shown in FIG. 5). The first hard phase, the first metal matrix phase and the first concentration gradient are similar to the corresponding features described above, and further description of these features will be omitted.

Figure 4:
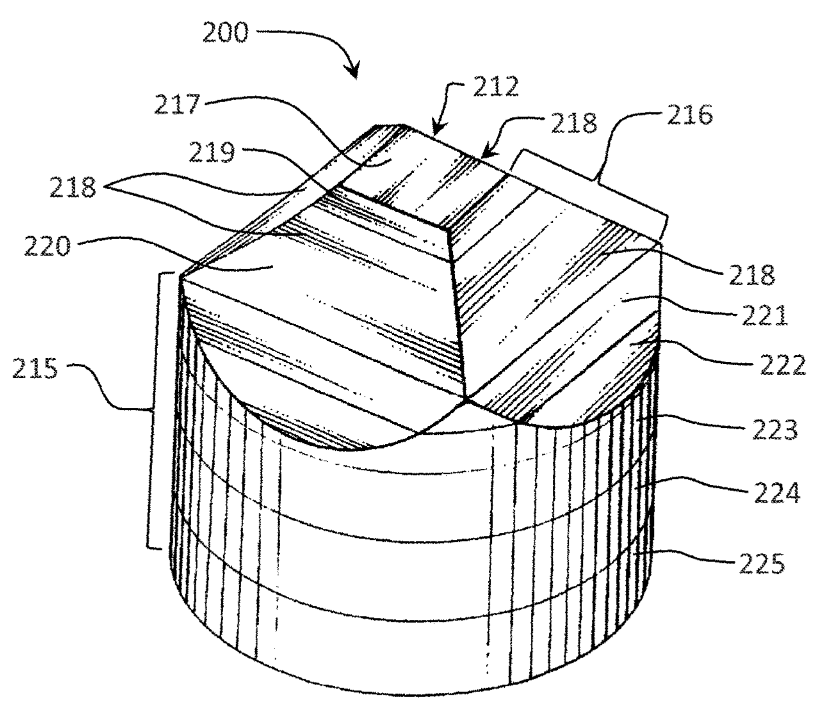
FIG. 4 is an isometric view of a multi-layered anvil for a cubic press.

As shown in FIG. 4, the working layer 219 has a square end or working face 217, which faces into the high pressure cavity of the press. Four lateral faces 218 slope away from the edges of the end face at about a 45° angle. The anvil may also include the second layer 220, the third layer 221, the fourth layer 222, the fifth layer 223, the sixth layer 224 and the seventh layer 225, as described in U.S. Pat. No. 5,780,139. These layers may be formed in the same manner as described in U.S. Pat. No. 5,780,139. At least one of these layers, however, may include a second concentration gradient. For example, the anvil may include a second layer including a second hard phase and a second metal matrix phase in which the second hard phase is dispersed, wherein a concentration of the second metal matrix phase varies according to a second concentration gradient. For example, in FIG. 5 a cubic press anvil 300 including a first concentration gradient 311 that extends from a working surface 312 to a first gradient depth 313 within a working layer 319 and a second concentration gradient 331 that extends from a second gradient depth 333 within a second layer 320 to a surface 332 of the second layer 320. In FIG. 5, the anvil 300 also includes a third layer 321, a fourth layer 322, a fifth layer 323, a sixth layer 324 and a seventh layer 325.

Figure 6:
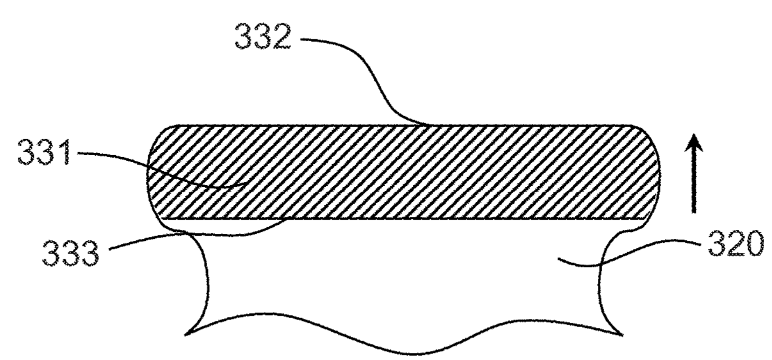
FIG. 6 is an enlarged view of a longitudinal cross section through a multi-layered anvil for a cubic press.

FIG. 6 is an expanded view of a portion of the second layer 320, which includes the second concentration gradient 331. In certain embodiments, the second layer 320 includes a second metal matrix phase concentration gradient such that the second layer 320 has a relatively higher concentration of the second metal matrix phase at a surface 332 of the second layer and a relatively lower concentration of the second metal matrix phase at a second gradient depth 333 within the second layer. As indicated by the arrow depicted in FIG. 6, the concentration of the second metal matrix phase may increase along the second concentration gradient 311 as it extends from the second gradient depth 333 within the second layer 320 to the surface 332 of the second layer 320. In certain embodiments, the concentration of the second metal matrix phase may increase continuously along the second concentration gradient 311 as it extends from the second gradient depth 333 within the second layer 320 to the surface 332 of the second layer 320.

By having a cobalt concentration at the surface 332 of the second layer that is higher than the cobalt concentration at a second gradient depth 333 within the second layer, the surface 332 of the second layer may have a toughness that is relatively higher than the toughness at the second gradient depth 333 within the second layer. Additionally, the surface 332 of the second layer may have a cobalt concentration that is relatively higher than the cobalt concentration in typical cemented tungsten carbide materials and, therefore, the surface 332 of the second layer may have a toughness that is relatively higher than the toughness of typical cemented tungsten carbide anvil materials. As a result of its increased toughness, the surface 332 of the second layer may have increased crack growth resistance. Accordingly, the surface 332 of the second layer may be positioned in the anvil so that it is exposed to the maximum shear stresses placed on the anvil and thereby improve the fatigue life of the anvil. For example, the surface 332 of the second layer may be positioned adjacent to the working layer 319. The anvil according to embodiments of the present invention may further include additional metal matrix phase concentration gradients as desired.

Figure 7:
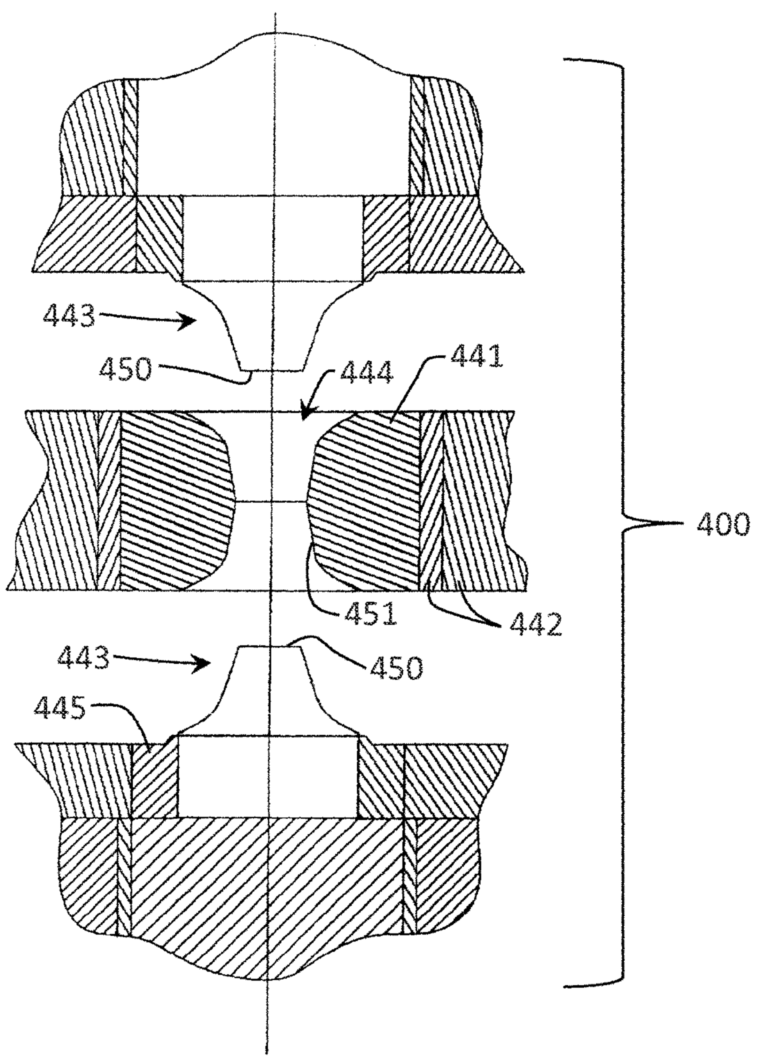
FIG. 7 is a longitudinal cross section through a belt and a pair of anvils for a belt press.

Another type of press commonly used in the diamond industry is known as a belt press. An illustrative belt press 400 is shown in FIG. 7. A belt press has an annular "belt" or ring having a central annular body 441 of surrounded by an annular body 442 (e.g., an annular body of high strength steel) press fit around the ring. The central annular body may 441 may be cemented carbide (e.g., cemented tungsten carbide) and may include a concentration gradient as described herein. A pair of approximately conical anvils 443 moves axially into tapered holes 444 in the belt for creating a high pressure within the belt between the anvils. The anvils may include cemented carbide (e.g., cemented tungsten carbide) and may include a concentration gradient as described herein. The anvils are surrounded by rings 445 (e.g., steel rings). As-described above, the gaps between the anvils and belt are sealed with pyrophyllite or the like.

The techniques described herein may be used for fabricating the cemented tungsten carbide belt and anvils for a belt press. For example, the annular working surface 451 of the belt, which encounters high pressure, may include a concentration gradient such that the working surface 451 has increased hardness, but decreased toughness. Each anvil has a working surface 450 that enters the hole in the center of the belt for applying high pressure. Accordingly, the working surface 450 may include a concentration gradient such that the working surface 450 has increased hardness, but decreased toughness.

Figure 8:
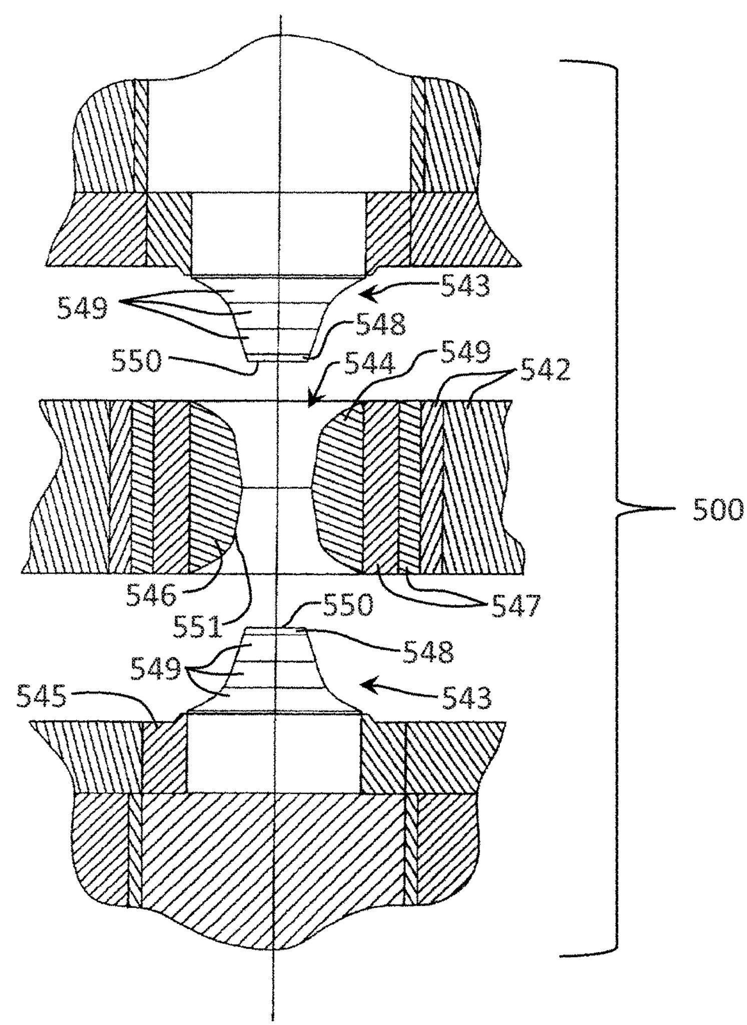
FIG. 8 is a longitudinal cross section through a multi-layered belt and a pair of multi-layered anvils for a belt press.
Figure 9:
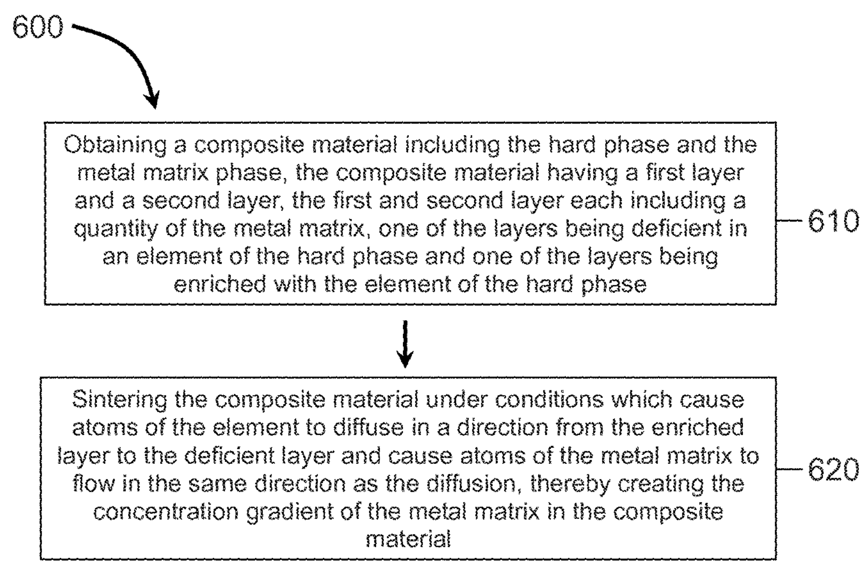
FIG. 9 is a flowchart illustrating one embodiment of a method of making an anvil.
Figure 10:
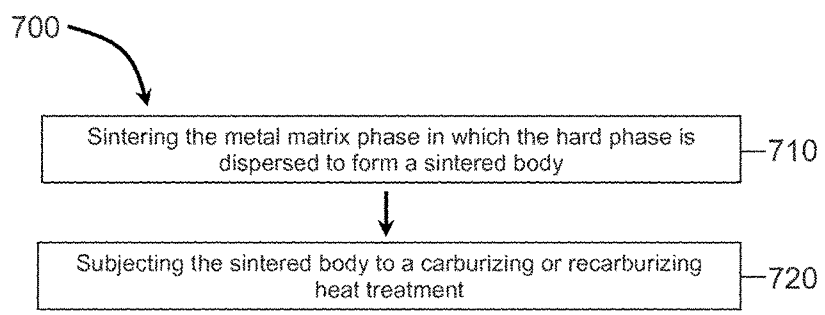
FIG. 10 is a flowchart illustrating one embodiment of a method of making an anvil.

An illustrative belt press 500 including a multilayered belt and multi-layered anvils is shown in FIG. 8. The belt press 500 has annular bodies 541 and 542, anvils 543, hole 544, and working surfaces 550 and 551, as described above. The anvils 543 are surrounded by rings 545 (e.g., steel rings). In this embodiment, however, the annular body 541 also includes an annular working layer 546 and supporting layers 547. The annular working layer 546 may include a concentration gradient to increase the hardness of the working surface 551, as described above. Additionally, at least one of the supporting layers 547 may include a concentration gradient to increase the toughness of a surface of the supporting layer, as described above.

In the belt press 500, the anvils 543 include a working surface 550, as described above, and they include a working layer 548 and supporting layers 549. The working layer 548 may include a concentration gradient to increase the hardness of the working surface 550 relative to the gradient depth, as described above. Additionally, at least one of the supporting layers 549 may include a concentration gradient to increase the toughness of a surface of the supporting layer, as described above. Any surfaces of the anvils and/or the working surfaces 551 of the belt may incorporate a concentration gradient as described herein.

Embodiments of the anvils and belts can be formed by any suitable method for forming an anvil or belt including a hard phase dispersed in a metal matrix phase, wherein the concentration of the metal matrix phase varies according to a concentration gradient. The shape of the anvil or belt may be formed using well-known machining methods. The concentration gradient may be formed before or after the shape of the anvil or belt is formed. For example, the anvil or belt may be formed by sintering, grinding to form the shape of the anvil or belt, and then treating to form the concentration gradient. Alternatively, the anvil or belt may be formed by sintering, treating to form a concentration gradient and then grinding to form the shape of the anvil or belt. In still yet another embodiment, the anvil or belt may be formed by concurrently sintering and forming the concentration gradient, and then grinding to form the shape of the anvil or belt.

The concentration gradient may be formed according to the methods described in U.S. Pat. Nos. 7,569,179 and 7,699,904, the entire contents of which are expressly incorporated by reference herein. For example, a method 600 of forming a hard phase dispersed in a metal matrix phase may include (610) obtaining a composite material comprising the hard phase and the metal matrix phase, the composite material having a first layer and a second layer, the first and second layer each containing a quantity of the metal matrix, wherein one of the layers is deficient in an element of the hard phase and one of the layers is enriched with the element of the hard phase. The method 600 may further include (620) sintering the composite material under conditions which cause atoms of the element to diffuse in a direction from the enriched layer to the deficient layer and cause atoms of the metal matrix to flow in the same direction as the diffusion, thereby creating the concentration gradient of the metal matrix in the composite material. The gradient can also be created in a separate high temperature cycle subsequent to the sintering process. For example, a fully formed anvil may be subjected to a post-sintering treatment according to any of the processes referenced herein, to form the concentration gradient.

Alternatively, the concentration gradient may be formed according to the methods described in U.S. Pat. Nos. 5,279,901; 5,453,241; 5,856,626; and 6,706,327, the entire contents of which are expressly incorporated by reference herein. For example, a method 700 of forming a hard phase dispersed in a metal matrix phase may include (710) sintering the metal matrix phase in which the hard phase is dispersed to form a sintered body, and (720) subjecting the sintered body to a carburizing or recarburizing heat treatment (e.g., a partially carburizing or recarburizing heat treatment) at high temperature.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An anvil comprising:

a first layer having a working surface for applying high pressure, the first layer comprising:

a hard phase; and a metal matrix phase in which the hard phase is dispersed, wherein a concentration of the metal matrix phase varies according to a concentration gradient, wherein the concentration gradient extends from the working surface to a gradient depth, and wherein the concentration of the metal matrix phase is less at the working surface than at the gradient depth.

2. The anvil of claim 1, wherein the hard phase comprises a hard material selected from the group consisting of tungsten carbide, tantalum carbide, titanium carbide and combinations thereof.

3. The anvil of claim 1, wherein the metal matrix phase comprises a material selected from the group consisting of Co, Fe, Ni and combinations thereof.

4. The anvil of claim 1, wherein the gradient depth is less than or equal to a thickness of the first layer.

5. The anvil of claim 4, wherein a concentration of the metal matrix phase at the working surface is lower than a concentration of the metal matrix phase at the gradient depth within the anvil by an amount in a range of about 1 to about 2%.

6. The anvil of claim 4, wherein a concentration of the metal matrix phase at the working surface is lower than a concentration of the metal matrix phase at the gradient depth within the anvil by an amount in a range of about 2 to about 4%.

7. The anvil of claim 4, wherein a concentration of the metal matrix phase at the working surface is lower than a concentration of the metal matrix phase at the gradient depth within the anvil by an amount in a range of about 4 to about 6%.

8. The anvil of claim 4, wherein the concentration of the metal matrix phase at the working surface is in a range of about 5 weight percent to about 9 weight percent based on the total weight of the hard phase and the metal matrix phase.

9. The anvil of claim 4, wherein the concentration of the metal matrix phase at the gradient depth within the anvil is in a range of about 9 weight percent to about 14 weight percent based on the total weight of the hard phase and the metal matrix phase.

10. The anvil of claim 4, wherein the concentration of the metal matrix phase increases along the concentration gradient as it extends from the working surface to the gradient depth within the anvil.

11. The anvil of claim 4, wherein the gradient depth within the anvil is in a range of about 0.1 mm to about 3 mm from the working surface.

12. The anvil of claim 1, wherein the anvil further comprises a second layer comprising:

a second hard phase; and a second metal matrix phase in which the second hard phase is dispersed, wherein a concentration of the second metal matrix phase varies according to a second concentration gradient.

13. An ultra-high pressure press comprising the anvil of claim 1.

14. The ultra-high pressure press of claim 13, further comprising a belt comprising a hard phase and a metal matrix phase in which the hard phase is dispersed, wherein a concentration of the metal matrix phase varies according to a concentration gradient.

15. The anvil of claim 12, wherein the metal matrix phase is a first metal matrix phase, wherein the concentration gradient is a first concentration gradient which extends from the working surface to a first gradient depth, wherein the concentration of the second metal phase is higher at a surface of the second layer than at a second gradient depth of the second layer opposite the surface of the second layer.

16. The anvil of claim 15, wherein the first concentration gradient decreases from the first gradient depth to the working surface and the second concentration gradient increases from the second gradient depth to the surface of the second layer.

17. The anvil of claim 15, wherein the first concentration gradient extends along an entire thickness of the first layer and the second concentration gradient extends along an entire thickness of the second layer.

18. The anvil of claim 15, wherein the first gradient extends along less than an entire thickness of the first layer and wherein the second gradient extends along less than an entire thickness of the second layer.

* * * * *